United States Patent
Bang et al.

(10) Patent No.: US 11,440,526 B2
(45) Date of Patent: Sep. 13, 2022

(54) CONTROL METHOD FOR SSC AND ISG OF VEHICLE AND VEHICLE TO WHICH THE CONTROL METHOD IS APPLIED

(71) Applicants: HYUNDAI MOTOR COMPANY, Seoul (KR); KIA MOTORS CORPORATION, Seoul (KR)

(72) Inventors: Jung Hwan Bang, Seoul (KR); Jun Yong Lee, Gwangmyeong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 198 days.

(21) Appl. No.: 16/872,697

(22) Filed: May 12, 2020

(65) Prior Publication Data
US 2021/0086743 A1    Mar. 25, 2021

(30) Foreign Application Priority Data
Sep. 20, 2019    (KR) .................... 10-2019-0116167

(51) Int. Cl.
*B60W 10/10*    (2012.01)
*F02D 41/40*    (2006.01)
*B60W 10/20*    (2006.01)
*B60W 10/18*    (2012.01)

(52) U.S. Cl.
CPC ............ *B60W 10/10* (2013.01); *B60W 10/18* (2013.01); *B60W 10/20* (2013.01); *F02D 41/401* (2013.01)

(58) Field of Classification Search
CPC ...... B60W 10/10; B60W 10/18; B60W 10/20; F02D 2200/602; F02D 41/042; F02D 41/062; F02D 41/123; F02D 41/401; F02N 11/0822; F02N 2200/101; F02N 2200/102
See application file for complete search history.

(56) References Cited

U.S. PATENT DOCUMENTS

| | | | |
|---|---|---|---|
| 9,650,033 B2* | 5/2017 | Yang | B60K 6/52 |
| 11,125,200 B2* | 9/2021 | Bang | F02D 41/0225 |
| 11,220,989 B2* | 1/2022 | Byun | B60K 6/442 |
| 2010/0184562 A1* | 7/2010 | Senda | F02N 99/006 477/99 |
| 2012/0270701 A1* | 10/2012 | Christen | B60W 30/18072 477/171 |
| 2016/0167676 A1* | 6/2016 | Eo | B60W 50/082 701/99 |
| 2017/0291606 A1* | 10/2017 | Yamada | B60W 30/18018 |
| 2017/0313316 A1* | 11/2017 | Shiraishi | B60W 10/06 |

(Continued)

*Primary Examiner* — Carl C Staubach
(74) *Attorney, Agent, or Firm* — Lempia Summerfield Katz LLC

(57) ABSTRACT

A control method for an SSC function and an ISG function includes: determining, by a controller, whether a SSC activation condition is satisfied based on a vehicle running state information; stopping, by the controller, an engine and activating the SSC function by controlling a transmission to neutral when the SSC activation condition is satisfied; determining, by the controller, whether a first ISG operation condition including a first reference vehicle speed is satisfied based on the vehicle running state information in a state that the SSC function is activated; and deactivating, by the controller, the SSC function and activating the ISG function when it is determined that the first ISG operation condition is satisfied.

16 Claims, 5 Drawing Sheets

(56) References Cited

U.S. PATENT DOCUMENTS

2018/0244273 A1* 8/2018 Iwamoto ................ F16D 48/02
2020/0353928 A1* 11/2020 Won .................... F02N 11/0822
2022/0003175 A1* 1/2022 Koike ................... B60W 10/06

* cited by examiner

CONTROL METHOD FOR SSC AND ISG OF VEHICLE AND VEHICLE TO WHICH THE CONTROL METHOD IS APPLIED

CROSS-REFERENCE TO RELATED APPLICATION

This application claims priority to and the benefit of Korean Patent Application No. 10-2019-0116167, filed on Sep. 20, 2019, the entire contents of which are incorporated herein by reference.

FIELD

The present disclosure relates to a control method for a Start Stop Coasting (SSC) function and an Idle Stop and Go (ISG) function, and a vehicle to which the control method is applied.

BACKGROUND

The statements in this section merely provide background information related to the present disclosure and may not constitute prior art.

Efforts have been made worldwide to reduce carbon dioxide generated by combustion of a fuel in vehicles and to improve fuel efficiency of vehicles in accordance with an era of high oil prices.

An idle stop and go (ISG) system has been developed to meet these goals. It has been proven that the ISG system can reduce an amount of carbon dioxide generated in the vehicle and can improve fuel efficiency.

The ISG system is an engine control system that stops or turns off an engine of a vehicle to prevent the engine from operating when the vehicle decelerates or stops. The ISG system drives the engine again to enable the vehicle to move when the vehicle starts.

The ISG system uses information such as the vehicle speed, the engine speed, and the engine coolant temperature to stop the engine when the engine is idling. In other words, the ISG system automatically stops the idling engine when the vehicle decelerates or stops, such as at a traffic signal, and restarts the engine to start the vehicle after a predetermined time. The ISG system may also be expressed as an idling stop control device. The ISG system can improve fuel economy by about 5 to 15% in a fuel economy mode. A vehicle equipped with the ISG system is referred to as an ISG vehicle.

Because the ISG system prevents the engine from operating when the vehicle decelerates or stops, fuel is not used. Thus, the fuel efficiency of the vehicle can be improved and carbon dioxide is not discharged.

However, the currently applied ISG system operates at a vehicle speed of about 5 kph or less, so the fuel consumption effect is limited.

We have discovered that, in a related art, the vehicle may not enter the ISG (Idle Stop & Go) state when a clutch pedal is pressed while a transmission gear is engaged during deceleration of the vehicle.

The above information disclosed in this Background section is only for enhancement of understanding of the background of the present disclosure and therefore it may contain information that does not form the prior art that is already known to a person of ordinary skill in the art.

SUMMARY

The present disclosure provides a control method for a Start Stop Coasting (SSC) function and an Idle Stop and Go (ISG) function, when a section for stopping an engine is expanded, and a vehicle to which the control method is applied.

A control method for a SSC function and an ISG function according to an exemplary form of the present disclosure includes: determining, by a controller, whether a SSC activation condition is satisfied according to a vehicle running state information; stopping, by the controller, an engine and activating the SSC function by controlling a transmission to neutral when it is determined that the SSC activation condition is satisfied; determining, by the controller, whether a first ISG operation condition including a first reference vehicle speed is satisfied according to the vehicle running state information in a state that the SSC function is activated; and deactivating, by the controller, the SSC function and activating the ISG function when it is determined that the first ISG operation condition is satisfied.

In one form, the SSC activation condition may be satisfied when an accelerator pedal is not operated, a brake pedal is not operated, a gear lever is in a traveling stage, and a vehicle speed is a predetermined SSC entry vehicle speed according to the vehicle running state information.

The predetermined SSC entry vehicle speed may be set differently according to the traveling stage of the gear lever.

The first ISG operation condition may be satisfied when it is determined that the accelerator pedal is not operated, the brake pedal is operated, the gear lever is in the traveling stage, and the vehicle speed is lower than the first reference vehicle speed according to the vehicle running state information.

The control method for the SSC function and the ISG function may further include: determining, by the controller, whether a second ISG operation condition is satisfied based on the vehicle running state information when the SSC activation condition is not satisfied. The second ISG operation condition includes a second reference vehicle speed set to be lower than the first reference vehicle speed.

The second ISG operation condition may be satisfied when it is determined that the accelerator pedal is not operated, the brake pedal is operated, the gear lever is in the traveling stage, and the vehicle speed is lower than the second reference vehicle speed according to the vehicle running state information.

The first reference vehicle speed and the second reference vehicle speed may be set differently according to the traveling stage of the gear lever.

The control method for the SSC function and the ISG function may further include: determining, by the controller, whether an SSC function deactivation condition is satisfied when the first ISG operation condition is not satisfied.

The SSC function deactivation condition may be satisfied when it is determined that the accelerator pedal is operated, the brake pedal is operated, the gear lever is not in the traveling stage, or the vehicle speed corresponds to a predetermined SSC function deactivation vehicle speed according to the vehicle running state information.

The ISG function may be performed by stopping the engine and controlling the transmission to the traveling stage.

A vehicle implementing a control method for an SSC function and an ISG function in an exemplary form of the present disclosure includes: a vehicle operation status detector including an accelerator pedal sensor for sensing an operation of an accelerator pedal and outputting a corresponding signal, a brake pedal sensor for sensing an operation of a brake pedal and outputting a corresponding signal, a gear lever sensor for sensing an operation of a gear lever and outputting a corresponding signal, and a vehicle speed sensor for sensing a vehicle speed and outputting a corresponding signal; an injector for injecting a fuel to an engine; an operation motor connected to the engine to selectively start the engine; a transmission; a controller for controlling the operations of the injector, the operation motor, and the transmission according to an output signal of a vehicle operation status detector; and a memory communicating with the controller. In particular, the controller determines whether an SSC activation condition is satisfied according to an output signal of the vehicle operation status detector, when it is determined that the SSC activation condition is satisfied, the controller controls the operation of the injector to stop fuel injection and controls the transmission to neutral to activate a SSC function, in a state that the SSC function is activated. The controller determines whether a first ISG operation condition including a first reference vehicle speed is satisfied according to an output signal of the vehicle operation status detector, and when it is determined that the first ISG operation condition is satisfied, the SSC function is deactivated and the ISG function is activated.

The SSC activation condition may be satisfied when the controller determines that the accelerator pedal is not operated, the brake pedal is not operated, the gear lever is in the traveling stage, and the vehicle speed is a predetermined SSC entry vehicle speed according to an output signal of the vehicle operation status detector.

The first ISG operation condition may be satisfied when it is determined that the accelerator pedal is not operated, the brake pedal is operated, the gear lever is in the traveling stage, and the vehicle speed is lower than the first reference vehicle speed according to the output signal of the vehicle operation status detector.

When the SSC activation condition is not satisfied, the controller determine whether a second ISG operation condition is satisfied based on the output signal from the vehicle operation status detector, wherein the second ISG operation condition includes a second reference vehicle speed set to lower than the first reference vehicle speed, and when the second ISG operation condition is satisfied, the controller may control the operation of the injector to stop fuel injection and may control the transmission to be operated in the traveling stage to activate the ISG function.

The second ISG operation condition may be satisfied when it is determined that the accelerator pedal is not operated, the brake pedal is operated, the gear lever is in the traveling stage, and the vehicle speed is lower than the second reference vehicle speed according to the output signal of the vehicle operation status detector.

When it is determined that the first ISG operation condition is not satisfied, and the SSC function deactivation condition is satisfied, the controller may control the operation of the injector to inject a fuel and may control the transmission to be operated in the traveling stage.

The SSC function deactivation condition may be satisfied when it is determined that the accelerator pedal is operated, the brake pedal is operated, the gear lever is in the traveling stage, or the vehicle speed corresponds to a predetermined SSC function deactivation vehicle speed according to an output signal of the vehicle operation status detector.

The transmission may be an automatic transmission or a dual clutch transmission.

The operation motor may be an MHSG (Mild Hybrid Starter Generator).

According to the control method for the SSC function and the ISG function and the vehicle to which the control method is applied in an exemplary form of the present disclosure, a section for stopping the engine is expanded such that fuel consumption of the vehicle may be improved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
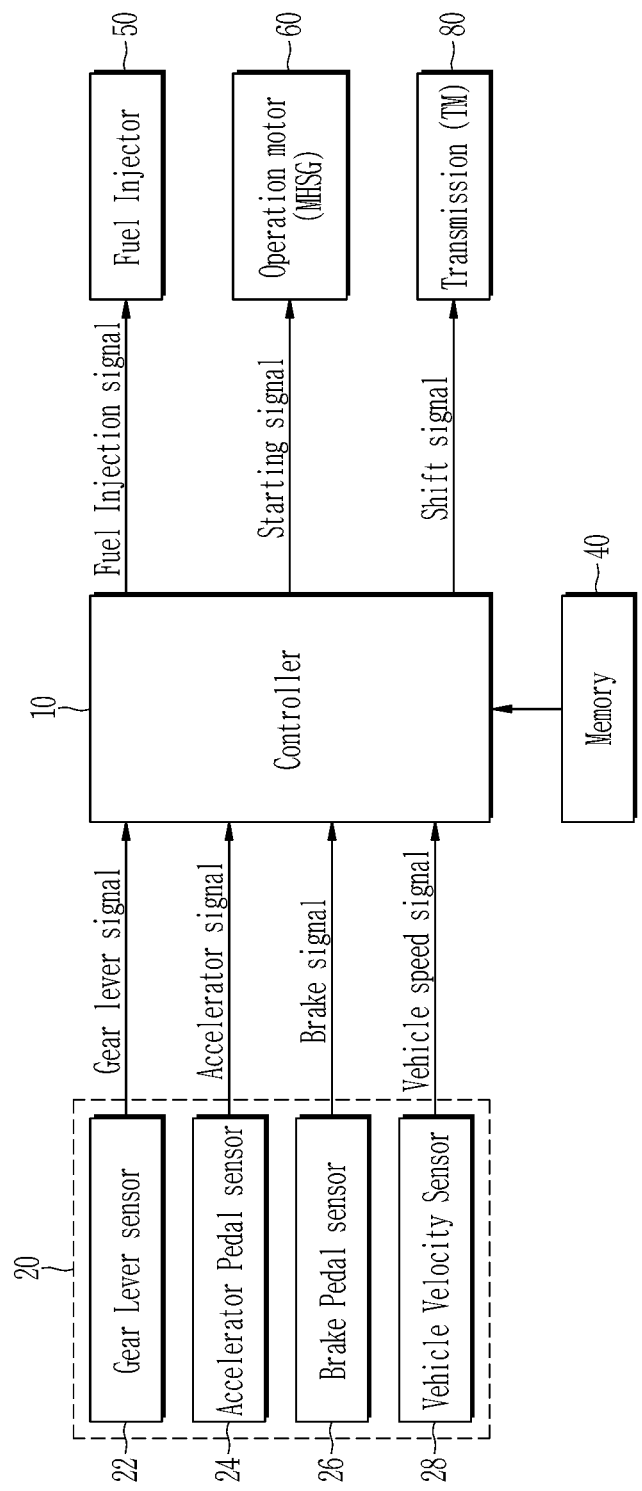
FIG. 1 is a block diagram of a vehicle to which an SSC function and an ISG function are applied according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In order to better understand the present disclosure and the object achieved by the forms of the present disclosure, the accompanying drawings illustrating forms of the present disclosure and contents described in the accompanying drawings are to be referenced.

Hereinafter, the present disclosure will be described in detail by explaining an exemplary form of the present disclosure with reference to accompanying drawings. In describing the present disclosure, if it is determined that the detailed description of related known configurations or functions may obscure the gist of the present disclosure, the detailed description thereof will be omitted.

The terminology used herein is for the purpose of describing particular example forms only and is not intended to be limiting of the present disclosure. Singular expressions include a plurality of expressions unless the context clearly indicates otherwise. It should be further understood that the terms "include" or "have" used in the present specification specify the presence of features, numerals, steps, operations, components, or parts mentioned in the present specification, or a combination thereof, but do not preclude the presence or addition of one or more other features, numerals, steps, operations, components, parts, or a combination thereof.

Throughout this specification and the claims that follow, when it is described that an element is "coupled" to another element, the element may be "directly coupled" to the other element or "electrically or mechanically coupled" to the other element through a third element.

Unless defined otherwise, it is to be understood that the terms used in the present specification, including technical and scientific terms, have the same meanings as those that are generally understood by those having ordinary skill in the art. It should be understood that the terms defined by a dictionary are identical with the meanings within the context of the related art. Such terms should not be ideally or excessively formally defined unless the context clearly dictates otherwise.

The constituent elements or "units", blocks, or modules used in an exemplary form of the present disclosure are software such as tasks, classes, subroutines, processes, objects, threads of execution, and programs performed in a given area of memory. It may be implemented in hardware, software, field-programmable gate arrays (FPGAs), or application-specific integrated circuits (ASICs), or may be a combination of the software and hardware. The constituent elements or "-parts" may be included in a computer-readable storage medium, or a part of them may be distributed in a plurality of computers.

Figure 2:
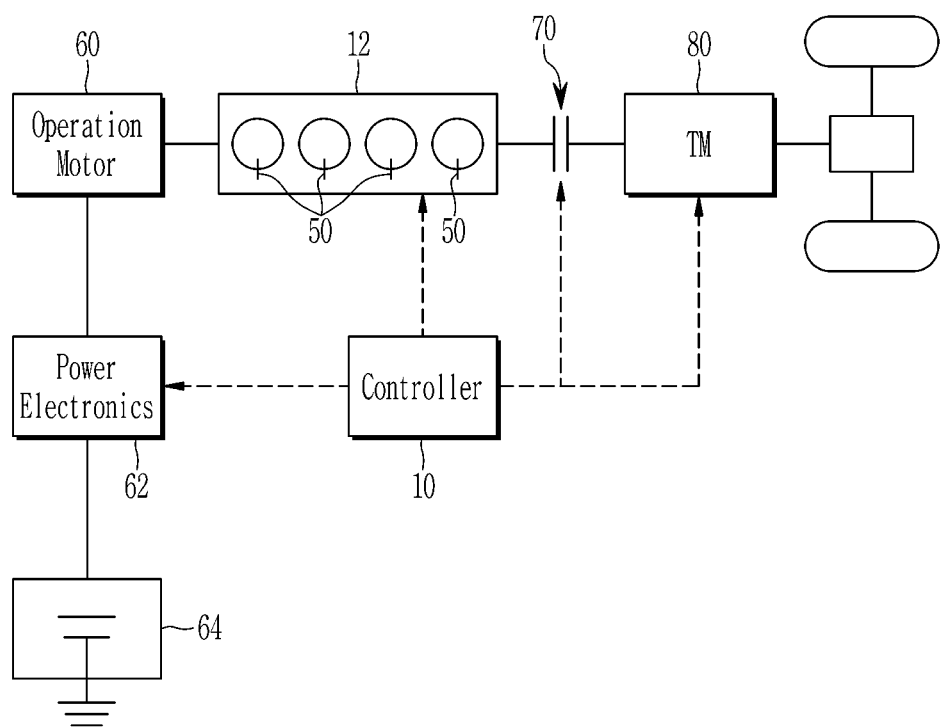
FIG. 2 is a view showing a vehicle to which an SSC function and an ISG function are applied according to an exemplary form of the present disclosure.

FIG. 1 is a block diagram of a vehicle to which an SSC function and an ISG function are applied according to an exemplary form of the present disclosure, and FIG. 2 is a view showing a vehicle to which an SSC function and an ISG function are applied according to an exemplary form of the present disclosure.

Referring to FIG. 1 and FIG. 2, a vehicle to which an SSC (Start Stop Coasting) function and an ISG (Idle Stop and Go) function are applied according to exemplary form of the present disclosure includes: a vehicle operation status detector 20, which measures various states of the vehicle and outputs corresponding signals, an injector 50 for injecting fuel into an engine 12, an operation motor 60 connected with the engine 12 for selectively starting the engine 12, a transmission 80, a controller 10 controlling the operations of the injector 50, the transmission 80, and the operation motor 60 according to the output signal of the vehicle operation status detector 20, and a memory 40 communicating with the controller 10.

The controller 10 may be, for example, a microprocessor (e.g., an ECU (Engine Control Unit or Electronic Control Unit)) or hardware including at least one microprocessor operated by a program. Further, the program may include a series of instructions for performing a control method of a vehicle including an ISG function according to one form of the present disclosure. The program may be stored in the memory 40.

The vehicle operation status detector 20 includes: an accelerator pedal sensor 24 for sensing operation of an accelerator pedal and outputting a corresponding signal, a brake pedal sensor 26 for sensing operation of a brake pedal and outputting a corresponding signal, a gear lever sensor 22 for sensing operation of a gear lever and outputting a corresponding signal, and a vehicle speed sensor 28 for sensing a vehicle speed and outputting a corresponding signal. The vehicle operation status detector 20 transmits vehicle running state information to the controller 10 and the vehicle running state information includes an accelerator pedal signal, a brake pedal signal, a gear lever signal, and a vehicle speed signal.

The vehicle to which the SSC function and the ISG function are applied includes a motor controller 62 for controlling the operation of the operation motor 60, a battery 64, and the transmission 80.

The battery 64 may be a general 12 V battery, a 48 V battery or a 12 V battery for a mild hybrid, or a 48 V battery.

The operating motor 60 is connected with the engine 12 via a gear or belt, and may be a starter motor applied to a general engine, or an MHSG (Mild Hybrid Starter & Generator) which may start the engine 12, assist the engine 12, or convert rotational energy of the engine 12 into electrical energy.

That is, depending on the running state of the vehicle, the operating motor 60 may be operated in an engine starting mode as well as an engine torque auxiliary mode that operates as a motor to assist the torque of the engine 12. Also, the operating motor 60 may be operated in a mode that supplies power to the vehicle's electrical load and charges a 48 volt battery that charges a 12 volt battery connected to the 48 volt battery through a low voltage DC-DC converter (LDC), in a regenerative braking mode to charge the 48 volt battery, and in a coasting driving mode to extend a travel distance. Thus, the operating motor 60 may be optimally controlled according to the running state of the vehicle to minimize the fuel consumption of the vehicle.

When the operating motor 60 is an MHSG driven at 48 V, a fuel cut-off area may be enlarged using a quick start response with the area.

The motor controller 62 may be powered by the battery 64 as an inverter and/or converter to drive the operating motor 60 or transfer electricity generated from the operating motor 60 to the battery 64.

The transmission 80 may be an automatic transmission or a dual clutch transmission.

In one form, when the transmission 80 is the automatic transmission, a torque converter 70 may be interposed between the engine 12 and the transmission 80 to transmit the power of the engine 12 to the transmission 80.

When the transmission 80 is the dual clutch transmission, the clutch 70 may be interposed between the engine 12 and the transmission 80 to transmit the power of the engine 12 to the transmission 80.

The vehicle speed sensor 28 measures a current vehicle speed and outputs the corresponding signal, and the memory 40 records and stores the vehicle speed while driving (velocity history).

Figure 3:
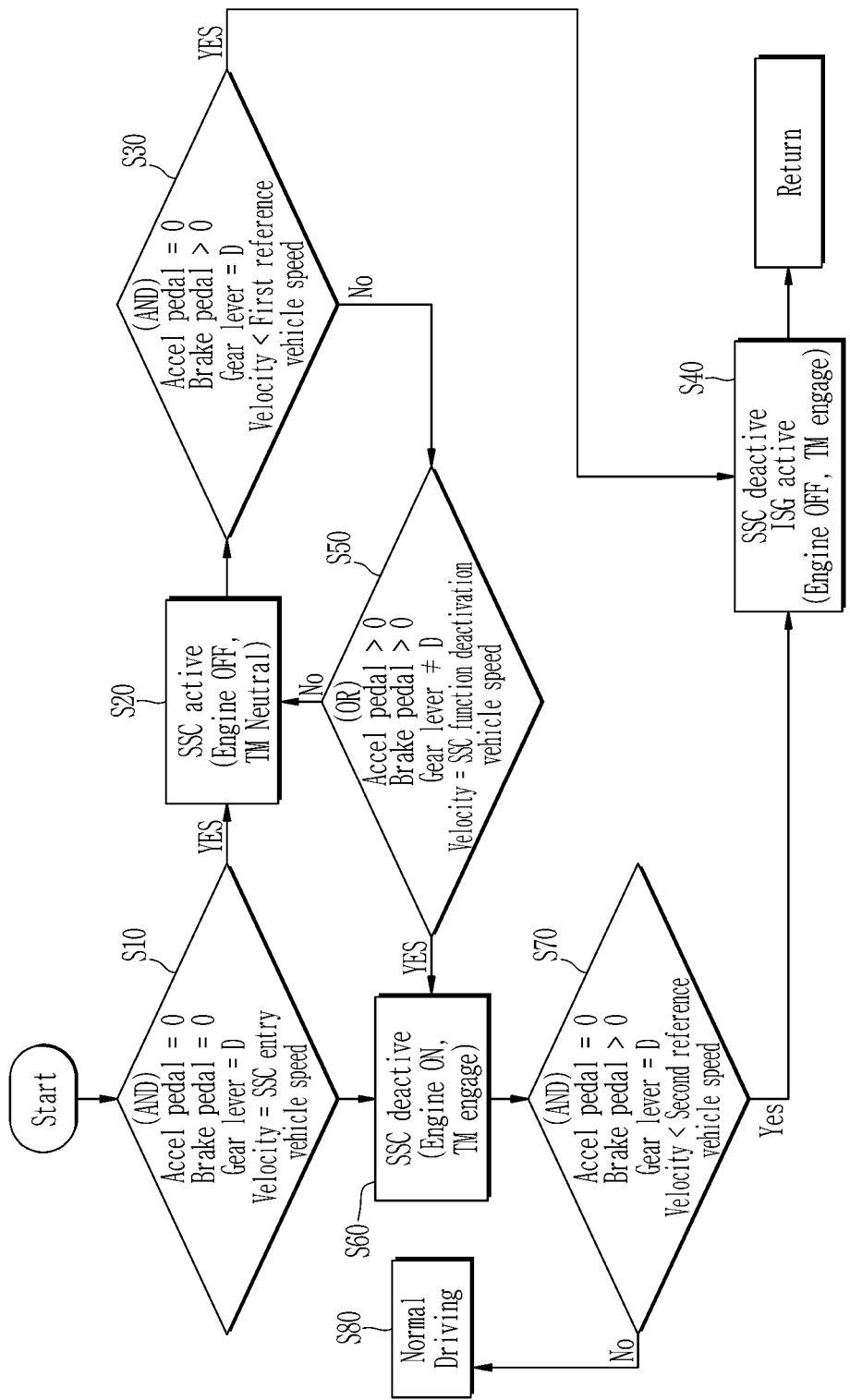
FIG. 3 is a flowchart showing a control method for an SSC function and an ISG function according to an exemplary form of the present disclosure.

FIG. 3 is a flowchart showing a control method for an SSC function and an ISG function according to an exemplary form of the present disclosure.

Next, the control method for the SSC function and the ISG function according to an exemplary form of the present disclosure is described with reference to FIG. 1 to FIG. 3.

The control method for the SSC function and the ISG function according to an exemplary form of the present disclosure includes a step (S10) for determining whether the controller 10 satisfies an SSC activation condition according to an output signal of the vehicle operation status detector 20, a step (S20) for stopping the engine 12 and controlling the transmission 80 to neutral to activate an SSC (Start Stop Coasting) function when it is determined that the controller 10 satisfies the SSC activation condition, a step (S30) for determining whether the controller 10 satisfies a first ISG operation condition including a first reference vehicle speed condition according to the vehicle running state information in the state that the SSC function is activated, and a step (S40) for deactivating the SSC function and activating the ISG function when the controller 10 satisfies the first ISG operation condition.

The SSC activation condition is satisfied when it is determined that the accelerator pedal is not operated, the brake pedal is not operated, a gear lever is in a traveling stage, and the vehicle speed is a predetermined SSC entry vehicle speed according to the output signal of the vehicle operation status detector 20 (S10), and the controller 10 stops the fuel injection by controlling the operation of the injector 50 and controls the transmission 80 to neutral to activate the SSC function (S20).

If the SSC function is activated, the fuel injection is stopped and the transmission 80 is controlled to neutral so that the SSC distance may be increased and the fuel consumption may be improved.

For example, when the transmission 80 is the automatic transmission, even if the gear lever is in the traveling stage, the controller 10 may control the transmission 80 to the neutral stage to increase the SSC distance.

The SSC entry vehicle speed may be set differently according to the traveling stage of the gear lever. For example, as the gear lever is in a higher stage, the predetermined vehicle speed may be set as a higher speed, and it may be set as 40~120 kph, but it is not limited thereto.

The first ISG operation condition may be satisfied when it is determined that the accelerator pedal is not operated, the brake pedal is operated, the gear lever is in the traveling stage, and the vehicle speed is lower than the first reference vehicle speed according to the vehicle running state information.

In the state that the SSC function is activated, if the driver operates the brake, it is determined that the deceleration or stopping of the vehicle is intended, the SSC function is deactivated, and the ISG function is activated (S40).

That is, the controller 10 may maintain the fuel injection stop and activate the ISG function by shifting the shift stage of the transmission 80 to the traveling stage D.

Since the transmission 80 is in the state that is shifted to the traveling stage, the traveling may be performed immediately if a launch condition is satisfied in the state that the ISG function is activated.

The first reference vehicle speed may be set differently depending on the traveling stage of the gear lever.

When the gear lever is in a higher stage, the first reference vehicle speed may be set as the higher speed, for example, 40 kph or less, but is not limited thereto.

The control method for the SSC function and the ISG function according to an exemplary form of the present disclosure may further include a step (S50) for determining whether an SSC function deactivation condition is satisfied when the controller does not satisfy the first ISG operation condition.

When it is determined that the accelerator pedal is operated, the brake pedal is operated, the gear lever is not in the traveling stage, or the vehicle speed corresponds to a predetermined SSC function deactivation vehicle speed according to the vehicle running state information, the SSC function deactivation condition determines that the driver intends to drive the vehicle (S50), and deactivates the SSC function (S60).

As shown in FIG. 3, even if the SSC activation condition (S10) is not satisfied, the SSC function SSC is deactivated (S60), the engine 12 maintains the operation state or is converted into the operation state, and the transmission 80 is maintained as the engaged state or is converted into the engaged state The SSC function deactivation vehicle speed may be set, for example, as a case that the current vehicle speed is less than 35 kph or more than 125 kph, but is not limited thereto.

The control method for the SSC function and the ISG function according to an exemplary form of the present disclosure further includes a step (S70) for determining whether the controller 10 satisfies a second ISG operation condition including a predetermined second reference vehicle speed condition that is lower than the first reference vehicle speed according to the vehicle running state information when the SSC activation condition S10 is not satisfied, that is, in the state that the SSC function is deactivated.

The second ISG operation condition may be satisfied when it is determined that the accelerator pedal is not operated, the brake pedal is operated, the gear lever is in the traveling stage, and the vehicle speed is lower than the second reference vehicle speed according to the vehicle running state information.

The second reference vehicle speed may be set differently according to the traveling stage of the gear lever.

For example, as the gear lever is the higher stage, the second reference vehicle speed may be set as the higher speed, and may be set as 25 kph or less, but is not limited thereto.

When the second ISG operation condition is not satisfied, normal driving is performed (S80), and a process (S10) for again determining whether the SSC activation condition is satisfied may be repeated.

The step (S70) determining whether the second ISG operation condition is satisfied may be performed when the SSC activation condition (S10) is not satisfied, and may also be performed when the SSC activation condition (S10) is satisfied, but the SSC function deactivation condition is satisfied (S50).

Figure 4:
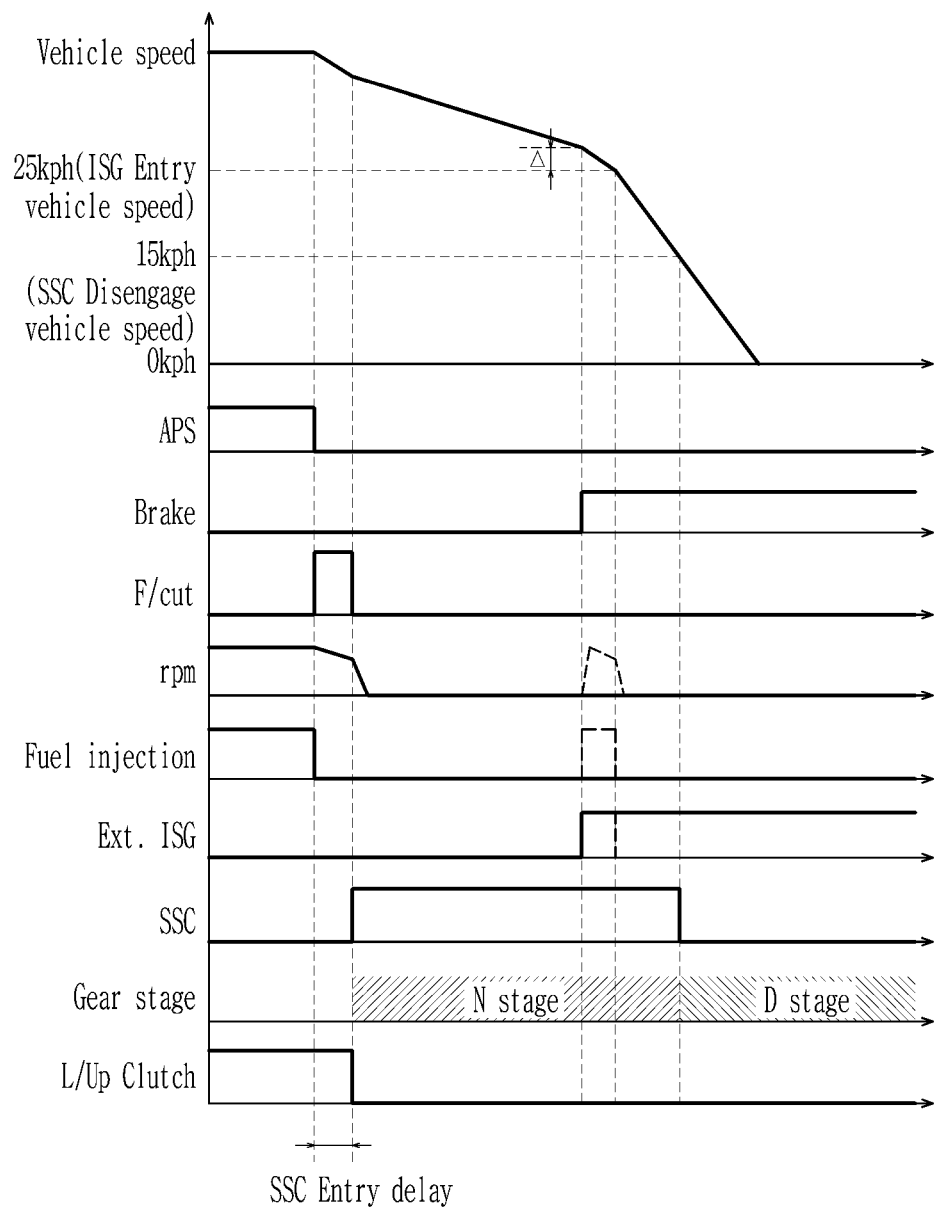
FIG. 4 and FIG. 5 are graphs to explain a control method for an SSC function and an ISG function according to an exemplary form of the present disclosure.
Figure 5:
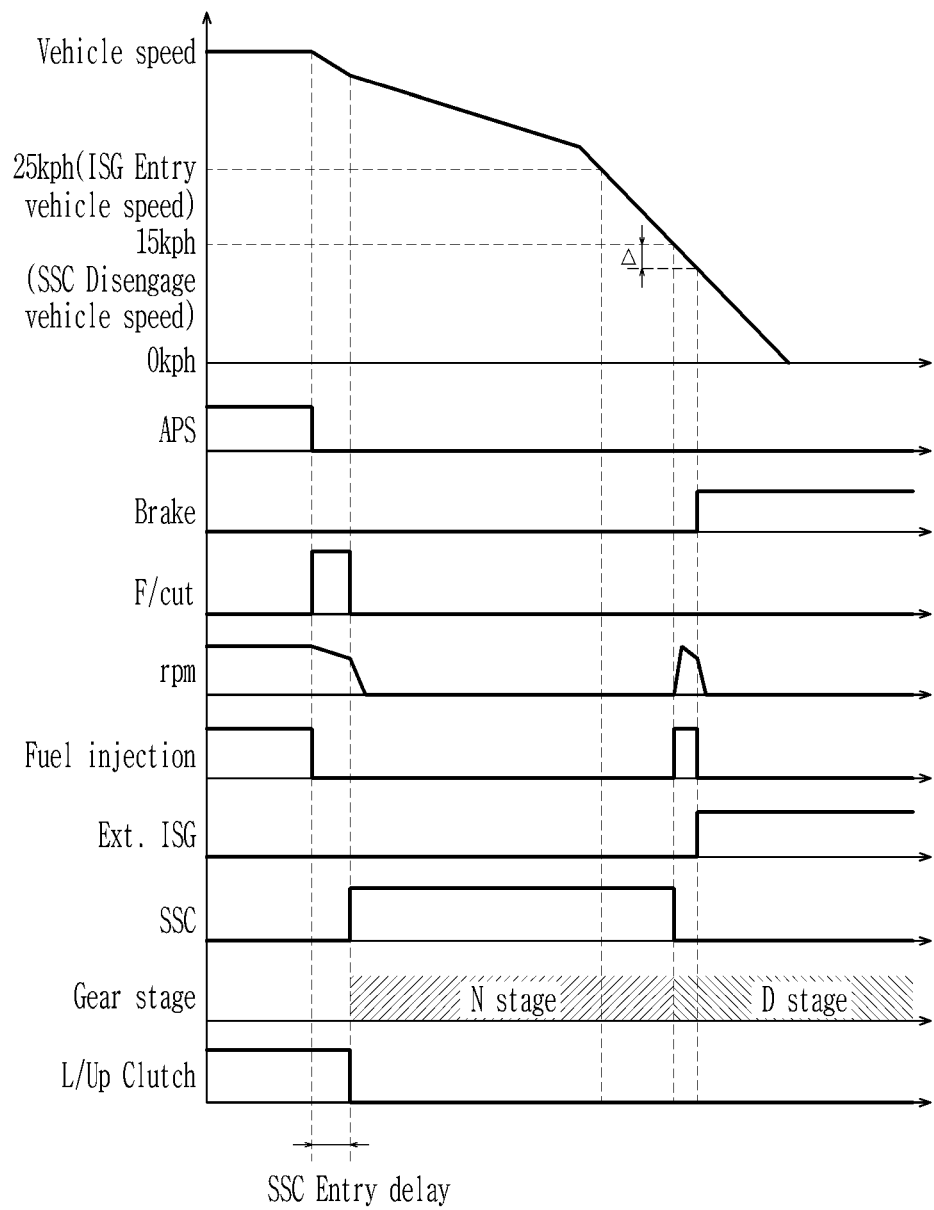

FIG. 4 and FIG. 5 are graphs showing a control method for an SSC function and an ISG function according to an exemplary form of the present disclosure.

Referring to FIG. 4, if the vehicle speed is a predetermined SSC entry vehicle speed, the accelerator pedal is not operated, the brake pedal is not operated, and the gear lever is in the traveling stage, a fuel cut signal is generated such that the fuel injection is stopped and the SSC function is activated. In this case, when the transmission 80 is the automatic transmission, a lock-up clutch may be disengaged.

If the first reference vehicle speed and the second reference vehicle speed are set as the same vehicle speed, for example, 25 kph, and the driver operates the brake at 30 kph, the engine is started while the SSC is deactivated, and then if the vehicle speed decreases and the ISG function control condition is satisfied, a process of stopping the engine again may be repeated.

However, the control method for the SSC function and the ISG function according to an exemplary form of the present disclosure sets the first reference vehicle speed to be higher than the second reference vehicle speed, thereby preventing a frequent On/Off of the engine in a transition process from the SSC function to the ISG function.

That is, in an exemplary form of the present disclosure, in the state that the SSC function is activated, the first reference vehicle speed of the first ISG operation condition may be set to be higher than the second reference vehicle speed to relatively widen a speed range of the transition from the SSC function to the ISG function, thereby preventing the frequent On/Off of the engine and extending the operation range of the ISG function.

That is, referring to FIG. 4, if the SSC function is activated, the fuel injection is stopped by the fuel cut signal such that an engine rpm is reduced to "0" and the transmission 80 is shifted into the neutral N.

Even if the driver operates the brake in the state that the SSC function is activated, the first reference vehicle speed of the first ISG operation condition is set to be relatively high such that the ISG function is activated and the fuel injection stop is maintained.

Next, in the state that the ISG function is activated, the SSC function may be deactivated and the engine 12 may maintain the Off state.

That is, the control method for the SSC function and the ISG function according to an exemplary form of the present disclosure may prevent the frequent On/Off of the engine.

The operation of the graph shown in FIG. 4 shows the states sequentially performing the steps of S10, S20, S30, and S40 with reference to FIG. 3.

Referring to FIG. 5, after the SSC function is activated and then the SSC function is deactivated, the state that the second ISG operation condition is satisfied and then the ISG function is activated is shown.

That is, referring to FIG. 3, the state that the steps of S10, S20, S50, S60, S70, and S40 are sequentially performed is shown.

The operation of the graph of FIG. 5 repeats the description of the operation of the above-described flowchart FIG. 3 such that the detailed description is omitted.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

| <Description of symbols> | |
| --- | --- |
| 10: controller | 12: engine |
| 20: vehicle operation status detector | 22: gear lever sensor |
| 24: clutch pedal sensor | 26: brake pedal sensor |
| 28: vehicle speed sensor | 30: rpm sensor |
| 40: memory | 50: injector |
| 60: operation motor | 62: motor controller |
| 64: battery | 70: torque converter or clutch |
| 80: transmission. | |

What is claimed is:

1. A control method for a Start Stop Coasting (SSC) function and an Idle Stop and Go (ISG) function, comprising:
   determining, by a controller, whether an SSC activation condition is satisfied based on a vehicle running state information;
   stopping, by the controller, an engine and activating the SSC function by controlling a transmission to neutral when it is determined that the SSC activation condition is satisfied;
   determining, by the controller, whether a first ISG operation condition including a first reference vehicle speed is satisfied based on the vehicle running state information in a state that the SSC function is activated;
   deactivating, by the controller, the SSC function and activating the ISG function when it is determined that the first ISG operation condition is satisfied; and
   determining, by the controller, whether a SSC function deactivation condition is satisfied when it is determined that the first ISG operation condition is not satisfied,
   wherein the ISG function is performed by stopping the engine and controlling the transmission to a traveling stage.

2. The control method of claim 1, wherein the SSC activation condition is satisfied when an accelerator pedal is not operated, a brake pedal is not operated, a gear lever is in a traveling stage, and a vehicle speed is a predetermined SSC entry vehicle speed based on the vehicle running state information.

3. The control method of claim 2, wherein the predetermined SSC entry vehicle speed is set differently based on the traveling stage of the gear lever.

4. The control method of claim 1, wherein the first ISG operation condition is satisfied when it is determined that an accelerator pedal is not operated, a brake pedal is operated, a gear lever is in a traveling stage, and a vehicle speed is lower than the first reference vehicle speed based on the vehicle running state information.

5. The control method of claim 1, further comprising:
   determining, by the controller, whether a second ISG operation condition is satisfied based on the vehicle running state information when the SSC activation condition is not satisfied,
   wherein the second ISG operation condition includes a second reference vehicle speed set to be lower than the first reference vehicle speed.

6. The control method of claim 5, wherein the second ISG operation condition is satisfied when it is determined that an accelerator pedal is not operated, a brake pedal is operated, a gear lever is in a traveling stage, and a vehicle speed is lower than the second reference vehicle speed based on the vehicle running state information.

7. The control method of claim 6, wherein the first reference vehicle speed and the second reference vehicle speed are set differently based on the traveling stage of the gear lever.

8. The control method of claim 1, wherein the SSC function deactivation condition is satisfied when it is determined that an accelerator pedal is operated, a brake pedal is operated, a gear lever is not in a traveling stage, or a vehicle speed corresponds to a predetermined SSC function deactivation vehicle speed based on the vehicle running state information.

9. A vehicle implementing a control method for a Start Stop Coasting (SSC) function and an Idle Stop and Go (ISG) function, the vehicle comprising:
   a vehicle operation status detector including an accelerator pedal sensor configured to sense an operation of an accelerator pedal and output a corresponding signal, a brake pedal sensor configured to sense an operation of a brake pedal and output a corresponding signal, a gear lever sensor configured to sense an operation of a gear lever and output a corresponding signal, and a vehicle speed sensor configured to sense a vehicle speed and output a corresponding signal;
   an injector configured to inject a fuel to an engine;
   an operation motor connected to the engine and configured to selectively start the engine;
   a transmission;
   a controller configured to control the injector, the operation motor, and the transmission based on an output signal from the vehicle operation status detector; and
   a memory configured to communicate with the controller,
   wherein the controller is configured to:
      determine whether an SSC activation condition is satisfied based on the output signal from the vehicle operation status detector,
      when the SSC activation condition is satisfied, control the injector to stop fuel injection and control the transmission to neutral to activate a SSC function,
      in a state that the SSC function is activated, determine whether a first ISG operation condition including a first reference vehicle speed is satisfied based on the output signal of the vehicle operation status detector, and when the first ISG operation condition is satisfied, deactivate the SSC function and activate the ISG function, wherein:

when the SSC activation condition is not satisfied, the controller is configured to determine whether a second ISG operation condition is satisfied based on the output signal from the vehicle operation status detector, wherein the second ISG operation condition includes a second reference vehicle speed set to lower than the first reference vehicle speed, and when the second ISG operation condition is satisfied, the controller is configured to control the injector to stop fuel injection and control the transmission to be operated in a traveling stage to activate the ISG function.

10. The vehicle of claim 9, wherein the controller determines that the SSC activation condition is satisfied when the accelerator pedal is not operated, the brake pedal is not operated, the gear lever is in a traveling stage, and the vehicle speed is a predetermined SSC entry vehicle speed based on the output signal from the vehicle operation status detector.

11. The vehicle of claim 9, wherein the first ISG operation condition is satisfied when the accelerator pedal is not operated, the brake pedal is operated, the gear lever is in a traveling stage, and the vehicle speed is lower than the first reference vehicle speed based on the output signal from the vehicle operation status detector.

12. The vehicle of claim 9, wherein the second ISG operation condition is satisfied when the accelerator pedal is not operated, the brake pedal is operated, the gear lever is in the traveling stage, and the vehicle speed is lower than the second reference vehicle speed based on the output signal from the vehicle operation status detector.

13. The vehicle of claim 9, wherein when the first ISG operation condition is not satisfied, and a SSC function deactivation condition is satisfied, the controller is configured to control the injector to inject a fuel and control the transmission to be operated in a traveling stage.

14. The vehicle of claim 13, wherein the SSC function deactivation condition is satisfied when the accelerator pedal is operated, the brake pedal is operated, the gear lever is in the traveling stage, or the vehicle speed corresponds to a predetermined SSC function deactivation vehicle speed based on the output signal from the vehicle operation status detector.

15. The vehicle of claim 9, wherein the transmission is an automatic transmission or a dual clutch transmission.

16. The vehicle of claim 9, wherein the operation motor is a Mild Hybrid Starter Generator (MHSG).

* * * * *